United States Patent
Hsu et al.

(10) Patent No.: US 8,814,414 B2
(45) Date of Patent: Aug. 26, 2014

(54) BACKLIGHT MODULE AND DISPLAY MODULE

(71) Applicant: Au Optronics Corporation, Hsinchu (TW)

(72) Inventors: Hung-Lung Hsu, Taichung (TW); Hsin-Li Chen, Yunlin County (TW); Yue-Hsian Lin, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 199 days.

(21) Appl. No.: 13/625,881

(22) Filed: Sep. 25, 2012

(65) Prior Publication Data
US 2014/0016350 A1  Jan. 16, 2014

(30) Foreign Application Priority Data
Jul. 11, 2012  (TW) .............................. 101124955 A (51) Int. Cl.
*F21V 7/04*  (2006.01)

(52) U.S. Cl.
USPC ........................................ 362/611; 362/97.1

(58) Field of Classification Search
USPC .................. 362/611, 615, 97.1, 97.3, 628
See application file for complete search history.

(56) References Cited

U.S. PATENT DOCUMENTS

2010/0271782 A1   10/2010   Miyashita

FOREIGN PATENT DOCUMENTS

| CN | 101872079 | 10/2010 |
| CN | 102346509 | 2/2012 |
| JP | 2008-299181 | 12/2008 |
| TW | M425296 | 3/2012 |

OTHER PUBLICATIONS

"First Office Action of China Counterpart Application", issued on Apr. 1, 2014, p. 1-p. 6.

*Primary Examiner* — Vip Patel
(74) *Attorney, Agent, or Firm* — Jianq Chyun IP Office (57) ABSTRACT

A backlight module and a display module are provided. The backlight module includes a back frame, a light guide plate, a heat sink, a light source module and a carrying frame. The light guide plate has a light emitting top surface and a light incident side surface, and is disposed on the back frame. The heat sink is disposed between the back frame and the light guide plate, and a side surface of the heat sink has a first fixing portion exposed outside the back frame. The light source module is disposed on the heat sink and faces the light incident side surface of the light guide plate. The carrying frame includes a first side wall, and is disposed around the light guide plate. The first side wall has a second fixing portion engaged with the first fixing portion, and is located outside the back frame.

20 Claims, 6 Drawing Sheets

BACKLIGHT MODULE AND DISPLAY MODULE

CROSS-REFERENCE TO RELATED APPLICATION

This application claims the priority benefit of Taiwan application serial no. 101124955, filed Jul. 11, 2012. The entirety of the above-mentioned patent application is hereby incorporated by reference herein and made a part of this specification.

BACKGROUND OF THE DISCLOSURE

1. Field of the Disclosure

The invention relates to a backlight module and a display module adapting the backlight module. More particularly, the invention relates to a backlight module satisfying a slim boarder design and a display module adapting the backlight module.

2. Description of Related Art

Recently, as display technology develops, flat panel display modules, such as liquid crystal displays, personal computer displays, and notebook computer displays have been widely used in daily life, and have a significant amount of applications. General flat panel display modules are mainly assembled through a backlight module and a display panel. A backlight module emits light through a light source, and can emit light through an edge type method or a direct type method. Emitting light through the edge type is adapted for a product with a larger boarder, such as a notebook computer or a tablet PC. In addition, emitting light through the edge type method and the direct type method can both be adapted for a display with large dimensions.

As the technology for displays have been continuously developing, the design for backlight modules of flat panel displays have also been continually researched. As the market requires, backlight modules have been trending towards designs that are thinner and have slim boarder. Generally, backlight modules adapted for displays with large dimensions provide higher power. Thus, a light emitting component with higher power of the backlight module is usually disposed on a heat sink, so as to prevent the light emitting device from overheating. Thus, the frame components of backlight modules adapted for displays with large dimensions usually include from outside to inside, a carrying frame, a back frame, and a heat sink. A fixing structure is located between the carrying frame and the back frame so as to restrict the position of the carrying frame relative to the back frame. In addition, when the backlight module is applied in the display module, a front frame is used to fix the display panel and the backlight module. A fixing structure is located between the front frame and the back frame, so as to fix the relative positions between the components.

One of ordinary skill in the art can change the structure of the carrying frame, so as to satisfy a slim boarder design. For example, the width of the top wall of the carrying frame is reduced. However, this will cause the overlapping region between the optical films and the carrying frame to decrease. When the display module is bumped when being transported, the optical film will be loosened, which affects display quality. In addition, another conventional method is making the structures of the front frame and the carrying frame to match each other, so as to satisfy the slim boarder design. For example, the carrying frame is designed to have no sidewalls, and to only have the fixing structure for the back frame. At the same time, the front frame will have a partial opening to contain the carrying frame and the fixing structure for the back frame. However, this will cause a reduction in the strength and deformation of the front frame and the carrying frame.

SUMMARY OF THE DISCLOSURE

The invention relates to a backlight module, satisfying a slim boarder design, including a stable structure, and providing good light emitting quality.

The backlight module of the invention includes a back frame, a light guide plate, a heat sink, a light source module, and a carrying frame. The light guide plate is disposed on the back frame, and has a light emitting top surface and a light incident side surface. The heat sink is disposed between the back frame and the light guide plate, and a side surface of the heat sink has a first fixing portion. The first fixing portion is exposed outside the back frame. The light source module is disposed on the heat sink and faces the light incident side surface of the light guide plate. The carrying frame is disposed around the light guide plate, and includes a first side wall. The first side wall is located outside the back frame, and includes a second fixing portion engaged with the first fixing portion.

The invention further provides a display module which adopts the aforementioned backlight module, to accomplish the slim boarder design, and provide good display quality.

The display module of the invention includes the aforementioned backlight module, a display panel, and a front frame. The display panel is disposed on the carrying frame, and covers the light emitting top surface of the light guide plate. The front frame is disposed around the display panel, and includes a fourth side wall. The fourth side wall is located outside the carrying frame.

In an embodiment, the back frame includes a base plate and a second side wall. The second side wall is connected to an edge of the base plate, and the second side wall covers a portion of the side surface of the heat sink.

In an embodiment, the heat sink includes a main body and a third side wall. The main body leans against a bottom portion of the light guide plate. The third side wall is erected on an edge of the main body, and the third side wall is substantially parallel to the first side wall.

In an embodiment, the light source module is adhered to the third side wall, and the first side wall and the light source module are respectively located on the two opposite sides of the third side wall.

In an embodiment, the side surface of the heat sink includes a first surface of the main body and a second surface of the third side wall. The second side wall covers the first surface.

In an embodiment, the second surface of the third side wall is substantially aligned to an outer surface of the second side wall.

In an embodiment, the first fixing portion is located at a connecting area between the main body and the third side wall.

In an embodiment, the first fixing portion includes a protrusion. The second fixing portion includes an opening, adapted to contain the protrusion.

In an embodiment, the display module further includes a plurality of optical films, located between the light guide plate and the display panel.

In an embodiment, the side surface of the heat sink further includes a third fixing portion, exposed outside the back frame and the carrying frame. The fourth side wall of the front frame includes a fourth fixing portion, engaged with the third fixing portion.

In an embodiment, the third fixing portion includes a protrusion. The fourth fixing portion includes an opening, adapted to contain the protrusion.

In an embodiment, the first fixing portion and the third fixing portion are formed by an additional processing towards a horizontal strip shaped rib on the side surface of the heat sink.

In order to make the aforementioned properties and advantages of the invention more comprehensible, embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DETAILED DESCRIPTION OF THE EMBODIMENTS

Figure 1:
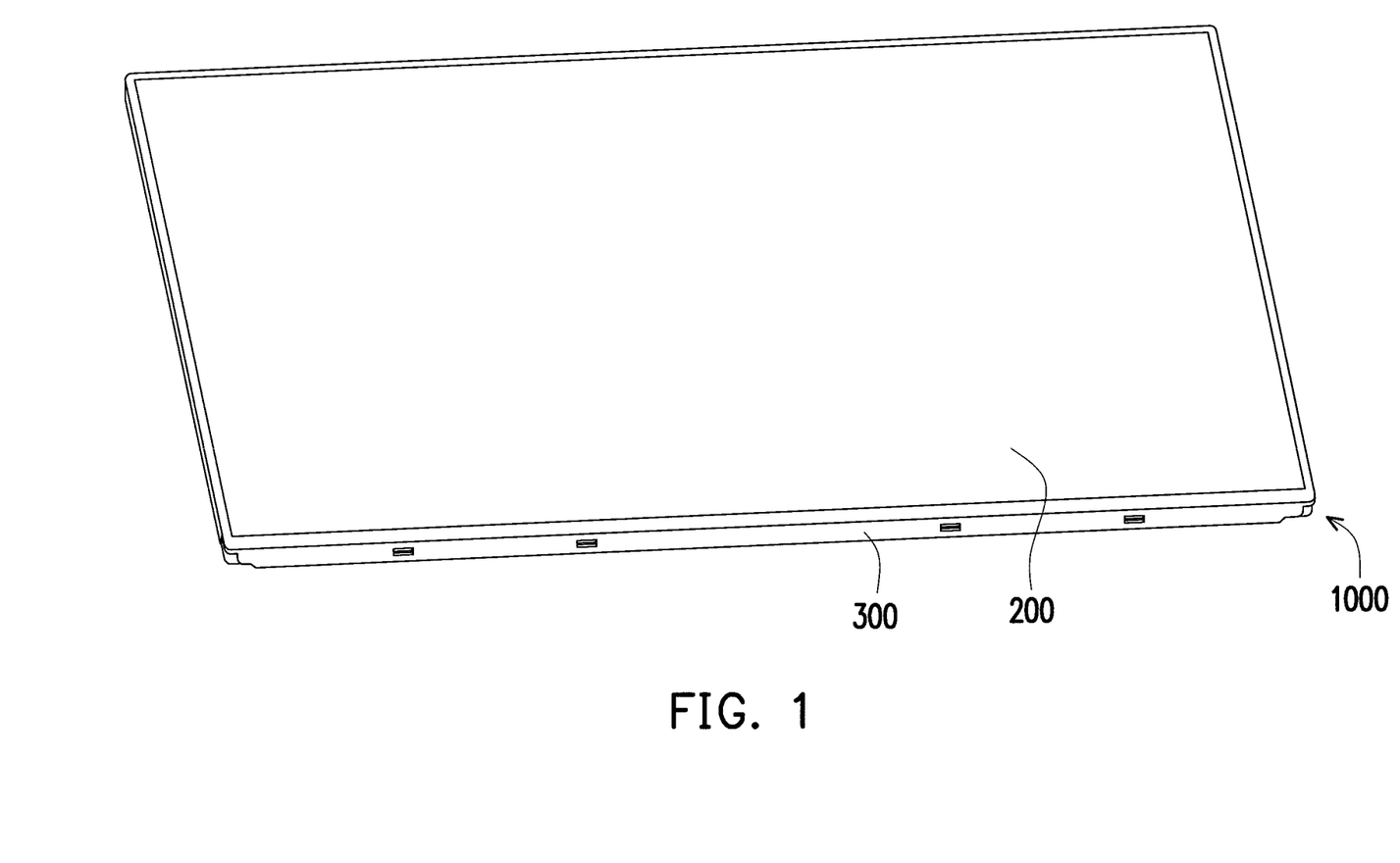
FIG. 1 is a schematic three-dimensional view of a display module according to an embodiment of the invention.
Figure 2:
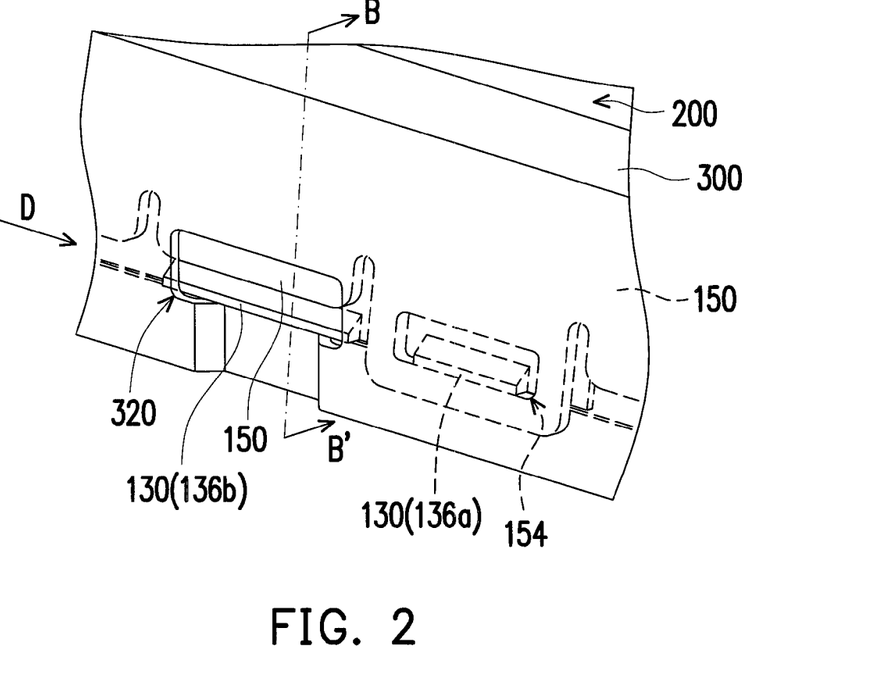
FIG. 2 is a schematic partially enlarged view of the display module of FIG. 1.
Figure 3:
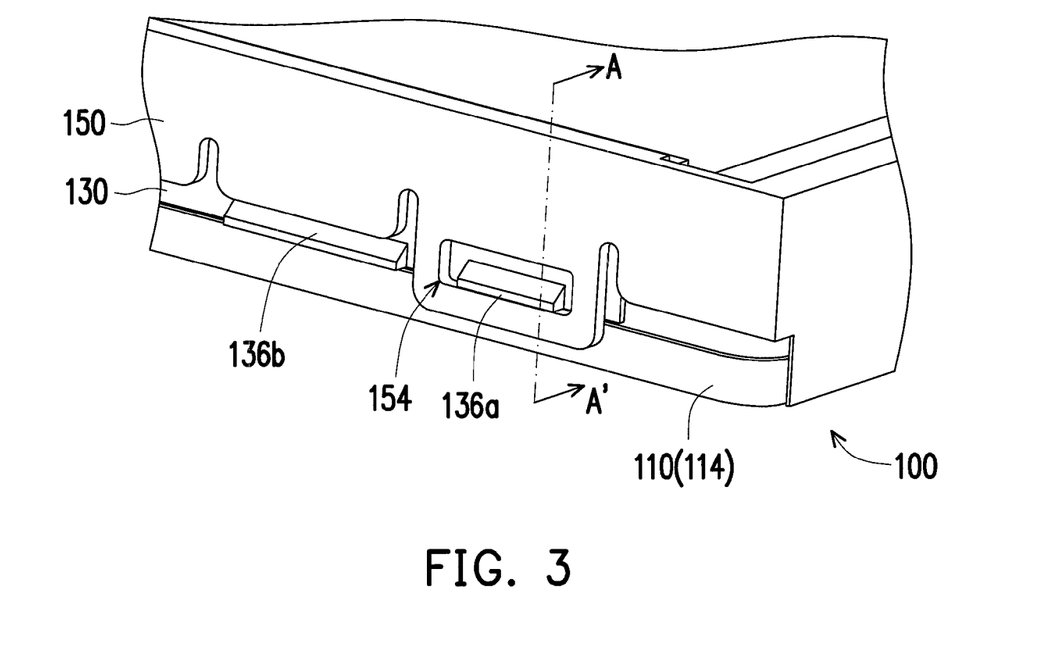
FIG. 3 is schematic partially enlarged view of the display module of FIG. 2 omitting a front frame and a display panel.
Figure 4:
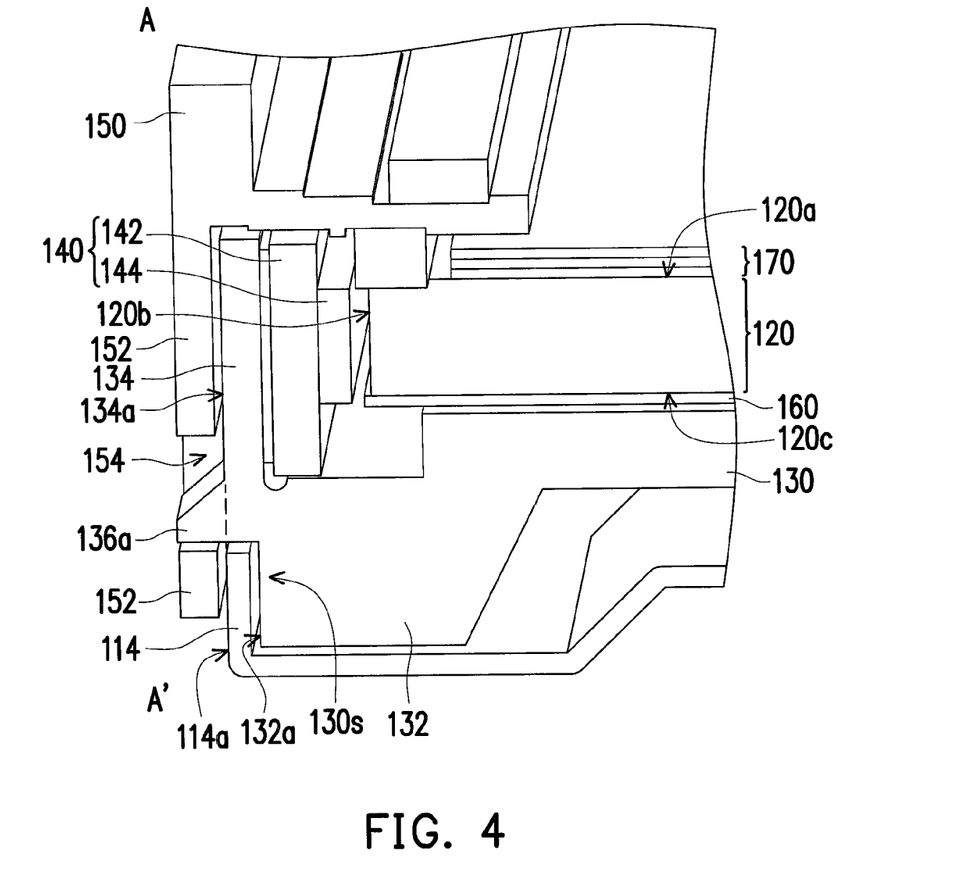
FIG. 4 is a schematic partial cross-sectional view the display module of the embodiment.

FIG. 1 is a schematic three-dimensional view of a display module according to an embodiment of the invention. FIG. 2 is a schematic partially enlarged view of the display module of FIG. 1. FIG. 3 is schematic partially enlarged view of the display module of FIG. 2 omitting a front frame and a display panel. FIG. 4 is a schematic partial cross-sectional view the display module of the embodiment.

Referring to FIG. 1, FIG. 2, FIG. 3, and FIG. 4, the cross-section of FIG. 4 can be referred to line A-A' of FIG. 3. The display module 1000 of the embodiment includes a backlight module 100, a display panel 200, and a front frame 300. The backlight module 100 and the display panel 200 can be independently manufactured, shipped, and sold. In order to conveniently describe the embodiment, the entire display module 1000 is described as an example. However, the description is not used to limit the scope of the invention.

The backlight module 100 includes a back frame 110, a light guide plate 120, a heat sink 130, a light source module 140, and a carrying frame 150. The light guide plate 120 is disposed on the back frame 110, and has a light emitting top surface 120a and a light incident side surface 120a. The heat sink 130 is disposed between the back frame 110 and the light guide plate 120, and a side surface of the heat sink 130 has a first fixing portion 136a. The first fixing portion 136a is exposed outside the back frame 110. The light source module 140 is disposed on the heat sink 130 and faces the light incident side surface 120b of the light guide plate 120. The carrying frame 150 is disposed around the light guide plate, and the carrying frame 150 includes a first side wall 152. The first side wall 152 is located outside the back frame 110, and includes a second fixing portion 154. The second fixing portion 154 is engaged with the first fixing portion 136a.

Figure 5:
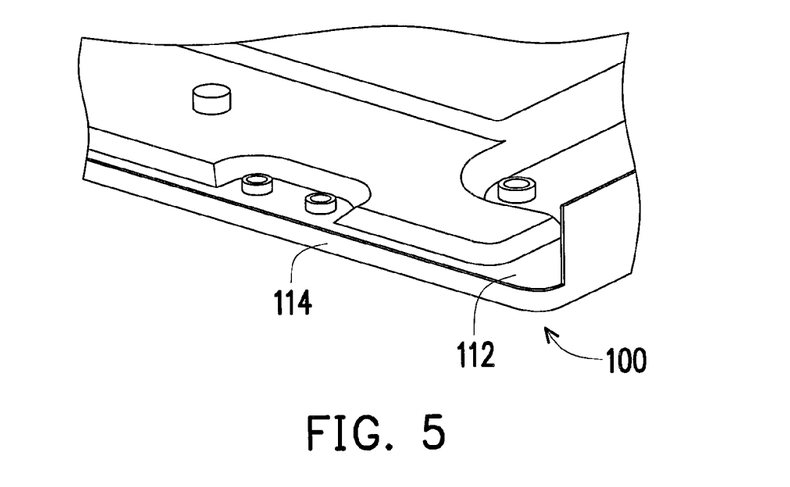
FIG. 5 is a schematic three dimensional view of a back frame of the embodiment.

The back frame 110 includes a base plate 112 and a second side wall 114. The second side wall 114 is connected to an edge of the base plate 112. The second side wall 114 extends towards the first fixing portion 136a of the heat sink 130, and the second side wall 114 covers a portion of the side surface of the heat sink 130. In the embodiment, the back frame 110 can maintain a particular strength and flatness. Thus, the back frame 110 is not easily deformed, as shown in FIG. 5.

The light guide plate 120 is located between the carrying frame 150 and the back frame 110. The light guide plate 120 further includes a reflective base surface 120c. The light incident side surface 120b is connected to the light emitting top surface 120a and the reflective base surface 120c. The light of the light source module 140 enters the light guide plate 120 from the light incident side surface 120b, and is emitted from the light emitting top surface 120a. In addition, a reflective piece 160, for example, is further disposed between the light guide plate 110 and the base plate 112, and is adapted to raise the light usage rate of the backlight module 100. Optical films 170 can be further disposed between the display panel 200 and the light guide plate 120. The optical films 170 include, for example, prism films, light enhancement films, polarizing films, or a combination of these films. The optical films 170 can adjust the optical properties, such as the light uniformity or brightness, of the light emitted from the light emitting top surface 120a.

Figure 6A:
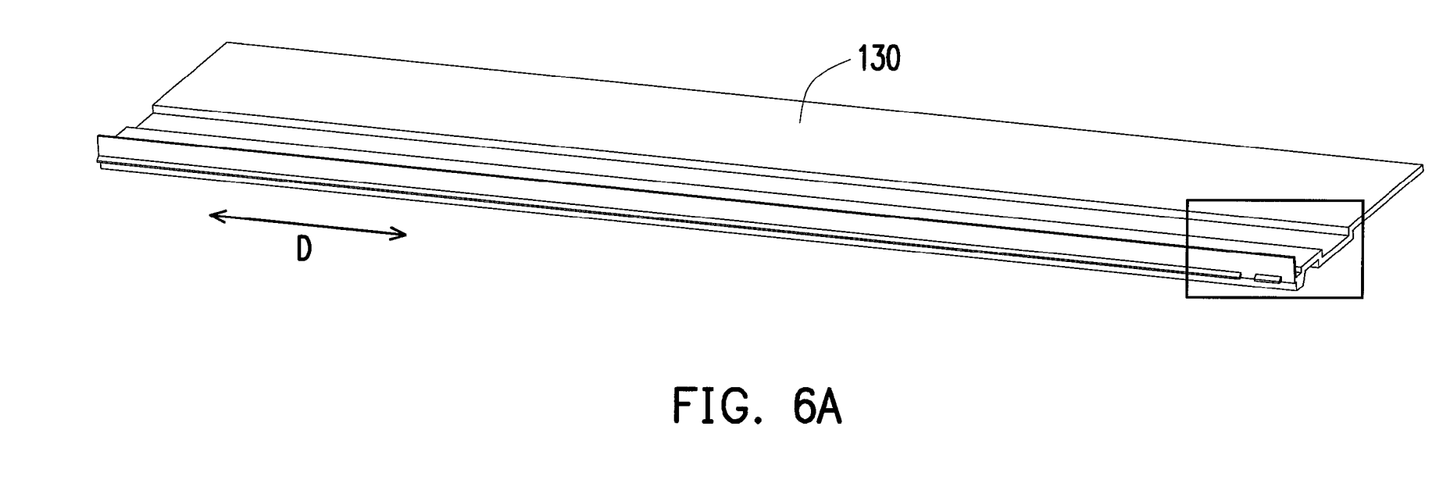
FIG. 6A is a schematic three dimensional view of a heat sink of the embodiment.
Figure 6B:
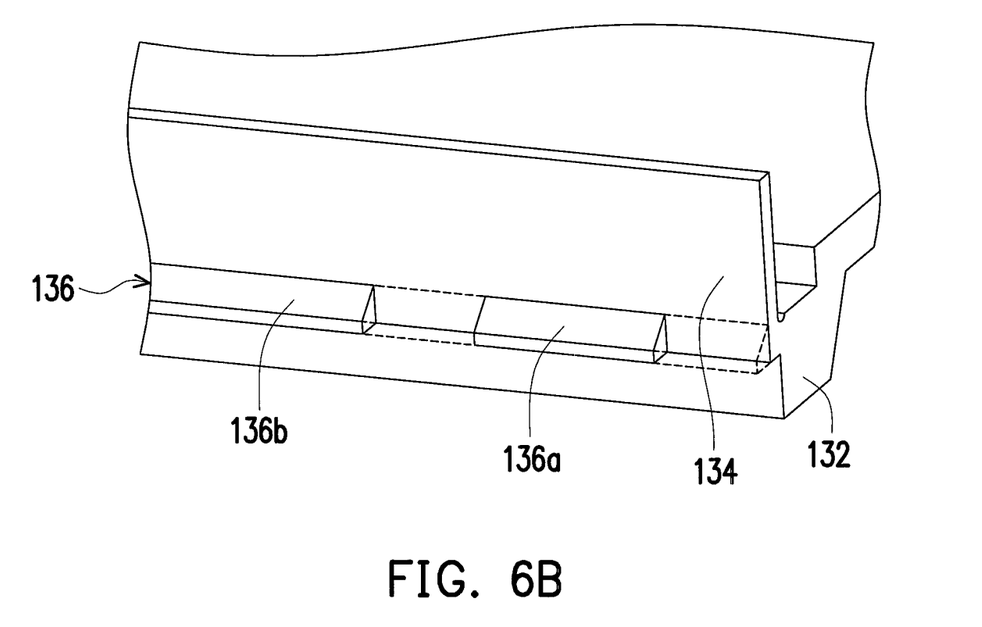
FIG. 6B is a partial enlarged view of the heat sink of FIG. 6A.
Figure 7:
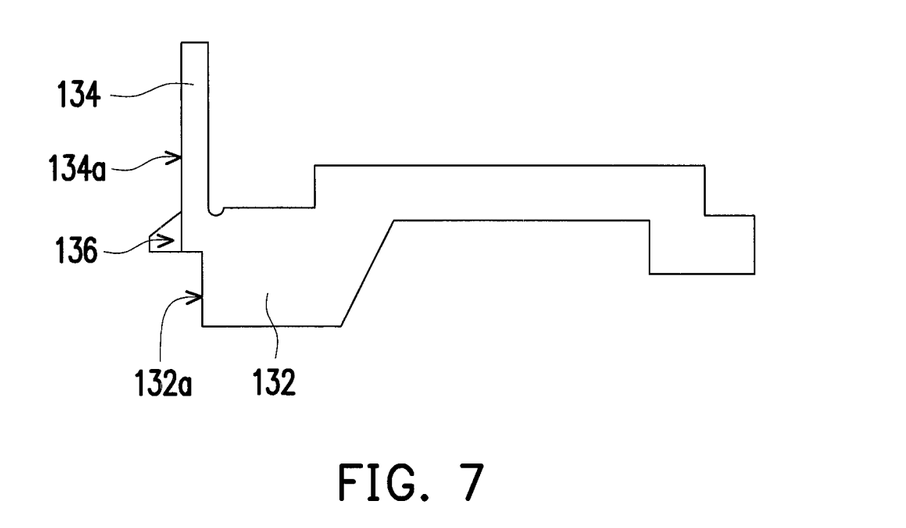
FIG. 7 is a schematic side view of the heat sink of FIG. 6A.

FIG. 6A is a schematic three dimensional view of a heat sink of the embodiment. FIG. 6B is a partial enlarged view of the heat sink of FIG. 6A. FIG. 7 is a side schematic view of the heat sink of FIG. 6A. Referring to FIGS. 6A, 6B, and 7, the heat sink 130 of the embodiment includes a main body 132 and a third side wall 134. In addition, the side surface of the heat sink 130 includes the first fixing portion 136a and a third fixing portion 136b. The first fixing portion 136a and the third fixing portion 136b are, for example, located at a connection area between the main body 132 and the third side wall 134. In the embodiment, the heat sink 130 is first formed with a side surface with a horizontal strip shaped rib 136. In detail, an extension direction D of the horizontal strip shaped rib 136, for example, is on the side surface of the heat sink, and is substantially parallel to a display surface of the display panel 200. Next, the horizontal strip shaped rib 136 is processed to form the first fixing portion 136a and the third fixing portion 136b. The processing method is, for example, a stamping method, so as to remove a portion of the horizontal striped shape rib 136 to form the first fixing portion 136a and the third fixing portion 136b. The stamping method has the advantages of high processing yield and precision. In further detail, since the embodiment adopts a stamping processing method to form the first fixing portion 136a and the third fixing portion 136b, the heat sink 130 is suitable for mass production. The production cost for the stamping process is lower than the production cost for a computer numerical control (CNC) processing method. In addition, the stamping processing method used to manufacture the heat sink 130 achieves high consistency and quality.

Referring to FIG. 1, FIG. 2, FIG. 3, and FIG. 4, in the embodiment, the main body 132 leans against a bottom portion of the light guide plate 120. The third side wall 134 is erected on an edge of the main body 132, and the third side wall 134 is substantially parallel to the first side wall 152 of the carrying frame 150. The heat sink 130 can provide good heat dissipation, so as to prevent the backlight module 100 from overheating due to high temperature.

In addition, the side surface of the heat sink 130 includes a first surface 132a of the main body 132 and a second surface 134a of the third side wall 134. The first surface 132a of the main body 132a, for example, is covered by the second side wall 114. In further detail, the main body 132 of the heat sink 130 is, for example, a recessed structure, so that the first surface 132a of the main body shrinks an inward distance relative to the second surface 134a of the third side wall 134 to form a space 130s. The space 130s is adapted to contain the second side wall 114, so that the second side wall 114 is aligned with the third side wall 134.

In the embodiment, the first fixing portion 136a of the heat sink 130 is located at a connecting area between the main body 132 and the third side wall 134. The first fixing portion 136a and the second fixing portion 154 are both located outside the back frame 110 and are engaged with each other, so as to restrict the relative positions between the heat sink 130 and the carrying frame 150. For example, the first fixing portion 136a is, for example, a protrusion, and the second fixing portion 154 is, for example, an opening. The opening is adapted to contain the protrusion, so as to provide the engaging effect. In detail, the protrusion passes through the opening to form a mutually engaged fixing structure. This effectively restricts the relative positions between the heat sink 130 and the carrying frame 150.

In addition, in conventional backlight modules, a back frame is located between the heat sink and the carrying frame, and a conventional backlight module uses a fixing structure located between the back frame and the carrying frame to restrict the relative positions thereof. Thus, the frame width of conventional backlight modules at least include a side wall width of the carrying frame, the side wall width of the back frame, and the side wall width of the heat sink. Comparatively, the backlight module 100 of the embodiment has the first fixing portion 136a of the heat sink 130 engaged with the second fixing portion 154 of the carrying frame 150. Further, the second side wall 114 of the embodiment is located is located in the space formed by the recessed structure of the heat sink 130. This way, an outer surface 114a of the second side wall 114 is substantially aligned with the second surface 134a of the third side wall 134. As such, the edge width of the backlight module 100 of the embodiment can reduce the thickness of the second side wall 114, and have a slim boarder design. In other words, the backlight module 100 of the embodiment does not need to reduce the overlapping distance between the carrying frame 150 and the optical films 170. Thus, the overlapping distance between the carrying frame 150 and the optical films 170 is enough, so that the optical films 170 will not easily be moved. This further reduces the possibility of the optical films 170 deforming and generating non-uniform light, or damage towards the optical films 170. In other words, the backlight module 100 of the embodiment provides good light emitting quality.

The light source module 140 includes a circuit board 142 and one or more light emitting elements 144 disposed on the circuit board 142. The light source module 140 is, for example, adhered to the third side wall 134 of the heat sink 130, and the first side wall 152 and the light source module 140 are respectively located on the two opposite sides of the third side wall 134. Specifically, the heat sink 130 can dissipate the heat generated from the light source module 140, so as to prevent the light emitting elements 144 of the light source module 130 from being damaged due to overheating. In detail, the circuit board 142 is disposed on the third side wall 134, and the light emitting elements 144 are disposed on the circuit board 142 facing a side of the light guide plate 120, so as to emit light into the light guide plate 110. After a portion of the light enters the light guide plate 110, the light is reflected by the reflective piece 160, and is emitted upwards towards the display panel 200. Herein, the light emitting devices 144 are, for example, light emitting diodes, so as to provide highly directional light sources.

Figure 8:
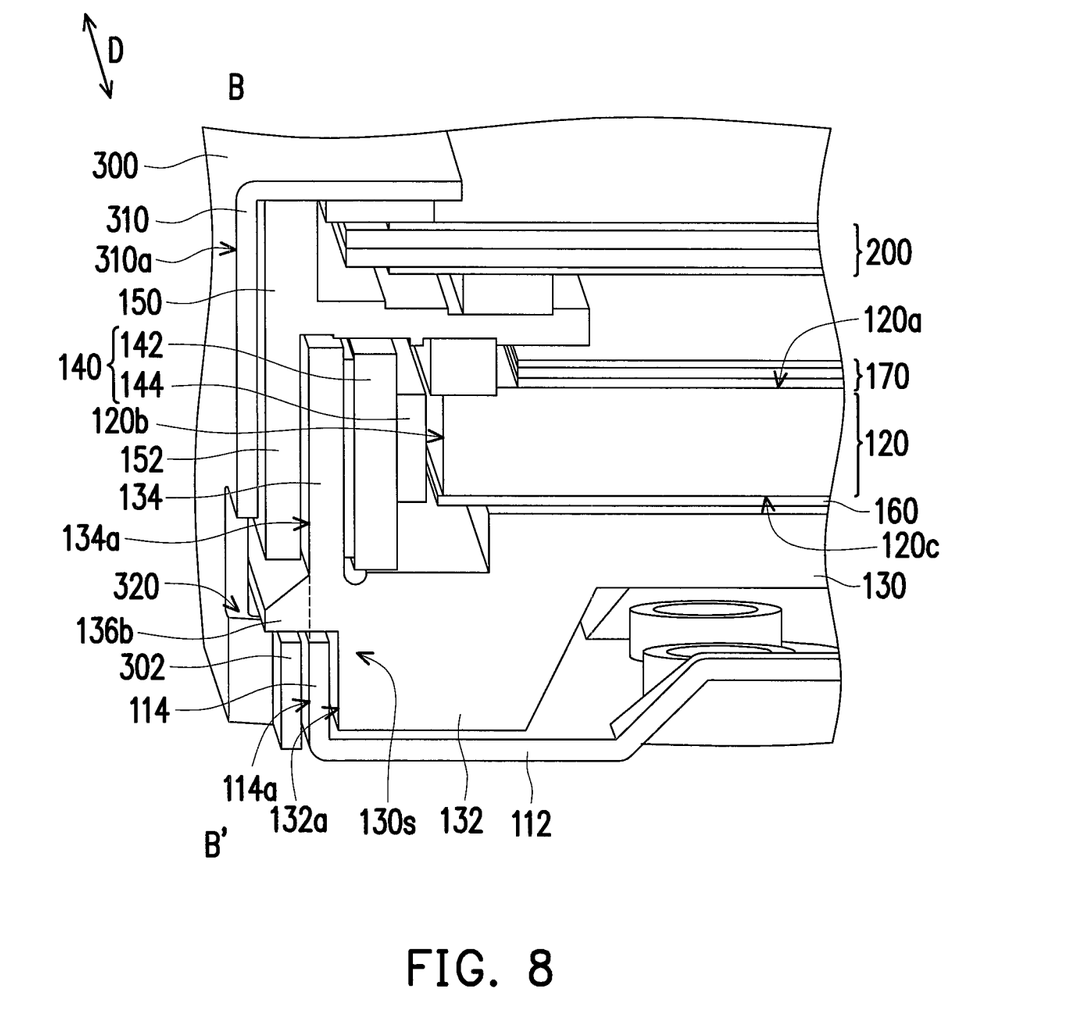
FIG. 8 is a schematic partial cross-sectional view the display module of the embodiment.

FIG. 8 is a schematic partial cross-sectional view the display module of the embodiment, wherein the cross-section of FIG. 8 can be referred to line B-B' of FIG. 2. Referring to FIG. 1, FIG. 2, and FIG. 8, in the embodiment, the display panel 200 is disposed on the carrying frame 150, and the display panel 200 covers the light emitting top surface 120a of the light guide plate 120. The front frame 300 is disposed surrounding the display panel 200. Using the back light module 100 of the embodiment as an example, the front frame 300 is used to fix the positions of the back light module 100 and the display panel 200. This structure is referred to as a front bezel structure.

The front frame 300 includes a fourth side wall 310. The fourth side wall 310 is located outside the carrying frame 150 and includes a fourth fixing portion 320. In the embodiment, the fourth fixing portion 320 is adapted to be engaged with the third fixing portion 136b of the heat sink 130. Specifically, the third fixing portion 136b is, for example, a protrusion, and the fourth fixing portion 320 is, for example, an opening. The opening is adapted to contain the protrusion, so as to provide the engaging effect. In the embodiment, a frame body 302 of the front frame 300 located below the fourth fixing portion 320 is, for example, shrunk a distance opposite to an outer surface 310a of the fourth side wall 310 towards the backlight module 100. The frame body 302 is located in the space 130s formed by the recessed structure of the heat sink 130, and the frame body 302 covers the outer surface 114a of the second side wall 114. Since the frame body 302 is engaged with the third fixing portion 136b, the relative positions between the front frame 300 and the heat sink 130 can be effectively restricted. Thus, the relative positions between the back light module 100 and the display panel 200 of the display module 1000 can be effectively restricted.

To sum up, the disclosure forms a fixing structure on a heat sink, as opposed to a conventional fixing design between a carrying frame and a back frame. This way, the fixing structure on the heat sink can fix the position of the carrying frame. Similarly, a front frame can be engaged with the fixing structure on the heat sink, and the entire assembly of the display module can be fixed. With the aforementioned design, the edge width of the back frame, the carrying frame, and the front frame can be reduced, so as to achieve a slim boarder design, and provide good light emitting and display quality. In addition, the design omits a portion of the material used for the back frame, and maintains the completeness of the back frame structure at the same time. This way, a good assembly yield and reliability of the product can be achieved. On the other hand, by using the fixing structure to fix the front frame and the carrying frame, the design provides a simple and effective assembly method, and allows a simple assembly process, further increasing manufacturing efficiency.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A backlight module comprising:
   a back frame;
   a light guide plate, disposed on the back frame, wherein the light guide plate includes a light emitting top surface and a light incident side surface; and
   a heat sink, disposed between the back frame and the light guide plate, and a side surface of the heat sink including a first fixing portion, wherein the first fixing portion is exposed outside the back frame;
   a light source module, disposed on the heat sink and facing the light incident side surface of the light guide plate; and
   a carrying frame, disposed around the light guide plate, and including a first side wall, wherein the first side wall is located outside the back frame, and includes a second fixing portion engaged with the first fixing portion.

2. The backlight module as claimed in claim 1, the back frame comprising:
   a base plate; and
   a second side wall, connected to an edge of the base plate, wherein the second side wall covers a portion of the side surface of the heat sink.

3. The backlight module as claimed in claim 2, the heat sink comprising:
   a main body, leaning against a bottom portion of the light guide plate; and
   a third side wall, erected on an edge of the main body, wherein the third side wall is substantially parallel to the first side wall.

4. The backlight module as claimed in claim 3, wherein the light source module is adhered to the third side wall, and the first side wall and the light source module are respectively located on two opposite sides of the third side wall.

5. The backlight module as claimed in claim 3, wherein the side surface of the heat sink includes a first surface of the main body and a second surface of the third side wall, and the second side wall covers the first surface.

6. The backlight module as claimed in claim 5, wherein the second surface of the third side wall is substantially aligned with an outer surface of the second side wall.

7. The backlight module as claimed in claim 1, wherein the first fixing portion includes a protrusion, and the second fixing portion includes an opening adapted to contain the protrusion.

8. The backlight module as claimed in claim 1, further comprising a plurality of optical films, located on the light emitting top surface of the light guide plate.

9. A display module comprising:
   a backlight module, comprising:
      a back frame;
      a light guide plate, disposed on the back frame, where the light guide plate includes a light emitting top surface and a light incident side surface; and
      a heat sink, disposed between the back frame and the light guide plate, and a side surface of the heat sink including a first fixing portion, wherein the first fixing portion is exposed outside the back frame;
      a light source module, disposed on the heat sink and facing the light incident side surface of the light guide plate; and
      a carrying frame, disposed around the light guide plate, and including a first side wall, wherein the first side wall is located outside the back frame, and includes a second fixing portion engaged with the first fixing portion;
   a display panel, disposed on the carrying frame, and covering the light emitting top surface of the light guide plate; and
   a front frame, disposed around the display panel, and including a fourth side wall, wherein the fourth side wall is located outside the carrying frame.

10. The display module as claimed in claim 9, the back frame comprising:
    a base plate; and
    a second side wall, connected to an edge of the base plate, wherein the second side wall covers a portion of the side surface of the heat sink.

11. The display module as claimed in claim 10, the heat sink comprising:
    a main body, leaning against a bottom portion of the light guide plate; and
    a third side wall, erected on an edge of the main body, wherein the third side wall is substantially parallel to the first side wall.

12. The display module as claimed in claim 11, wherein the light source module is adhered to the third side wall, and the first side wall and the light source module are respectively located on two opposite sides of the third side wall.

13. The display module as claimed in claim 11, wherein the side surface of the heat sink includes a first surface of the main body and a second surface of the third side wall, and the second side wall covers the first surface.

14. The display module as claimed in claim 13, wherein the second surface of the third side wall is substantially aligned with an outer surface of the second side wall.

15. The display module as claimed in claim 11, wherein the first fixing portion is located at a connection area between the main body and the third side wall.

16. The display module as claimed in claim 9, wherein the first fixing portion includes a protrusion, and the second fixing portion includes an opening adapted to contain the protrusion.

17. The display module as claimed in claim 9, further comprising a plurality of optical films, located between the light guide plate and the display panel.

18. The display module as claimed in claim 9, wherein the side surface of the heat sink further includes a third fixing portion, exposed outside the back frame and the carrying frame, and the fourth side wall of the front frame includes a fourth fixing portion engaged with the third fixing portion.

19. The display module as claimed in claim 18, wherein the third fixing portion includes a protrusion, and the fourth fixing portion includes an opening adapted to contain the protrusion.

20. The display module as claimed in claim 18, wherein the first fixing portion and the third fixing portion are formed by an additional processing towards a horizontal strip shaped rib on the side surface of the heat sink.

* * * * *